United States Patent Office 2,948,721
Patented Aug. 9, 1960

2,948,721

DIOXAZINE DYESTUFFS

Christoph Frey, Basel, Switzerland, assignor to Ciba Limited, Basel, Switzerland, a Swiss firm No Drawing. Filed July 21, 1958, Ser. No. 749,626

Claims priority, application Switzerland Aug. 28, 1957

5 Claims. (Cl. 260—246)

This invention provides new dioxazine dyestuffs that are free from groups imparting solubility in water and correspond to the general formula (1)
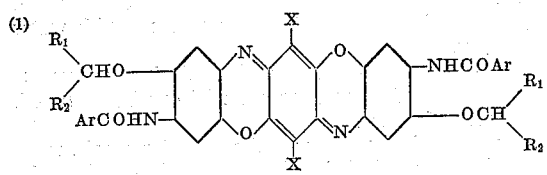

in which Ar represents an aromatic radical, $R_1$ and $R_2$ each represent a lower alkyl group, e.g. having from 1 to 4 carbon atoms, and X represents a hydrogen atom or a substituent.

The invention also provides a process for the manufacture of the dyestuffs of the above general formula, wherein (a) a compound of the general formula (2)
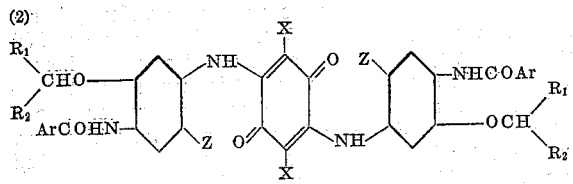

in which Ar, $R_1$, $R_2$ and X have the meanings given above, and Z represents a hydrogen atom or an alkoxy group, is treated with a non-sulfonating condensing agent or (b) a dioxazine of the general formula (3)
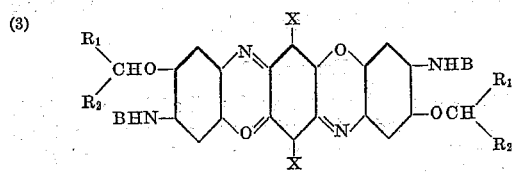

in which $R_1$, $R_2$ and X have the meanings given above, and B represents a hydrogen atom or the radical of an aliphatic carboxylic acid containing at most 4 carbon atoms, is reacted with a reactive derivative of an aromatic carboxylic acid, and the starting materials used are free from groups imparting solubility in water.

The compounds of the Formula 2 used as starting materials are advantageously prepared by condensing 1 molecular proportion of a para-benzoquinone with 2 molecular proportions of an amine of the formula (4)
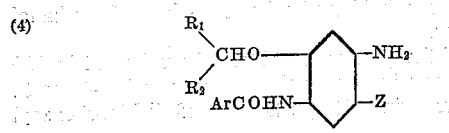

in which Ar, $R_1$, $R_2$ and Z have the meanings given above, or by reducing a compound of the general formula (5)
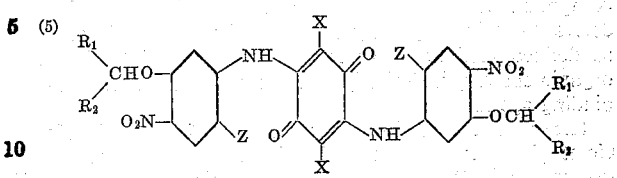

to the diamino-compound and then acylating the latter, the acylating conditions being so chosen that the acylation followed by ring closure to form the dioxazine take place in one operation. Those compounds of the Formula 3 in which B is a hydrogen atom can be obtained by reducing the corresponding dinitro-compounds, and those compounds of the Formula 3 in which B is an aliphatic acyl radical can be obtained by the condensation of a compound of the Formula 2 in which Ar is an alkyl group.

Of particular interest as starting materials for the process of this invention, owing to the ease with which they can be obtained, are those compounds of the Formulae 2 and 3 in which the two X's represent chlorine atoms. The lower alkyl groups $R_1$ and $R_2$ are preferably those containing not more than 2 carbon atoms.

ArCO represents the radical of an aromatic monocarboxylic acid, advantageously, one of the benzene series, and especially the radical of benzoic acid. There may also be mentioned radicals of benzene carboxylic acids which contain in the nucleus a substituent such as a halogen atom, especially a chlorine or bromine atom, an alkoxy group, especially a methoxy group, an alkly group, for example, a methyl group, an aryl group, for example, a phenyl group, or a cyano, nitro or acylamino group. As examples there may be mentioned radicals of the following benzene carboxylic acids:

4-methyl-benzene carboxylic acid,
2-fluorobenzene carboxylic acid,
2-chlorobenzene carboxylic acid,
4-chlorobenzene carboxylic acid,
2:4-dichlorobenzene carboxylic acid,
2:5-dichlorobenzene carboxylic acid,
4-bromobenzene carboxylic acid,
4-phenylbenzenecarboxylic acid,
4-methoxybenzene carboxylic acid,
4-cyanobenzene carboxylic acid, and
4-nitrobenzene carboxylic acid.

As examples of further aryl-carboxylic acids there may be mentioned the radical of 1- or 2-naphthoic acid.

For bringing about ring closure to form the oxazine rings the aforesaid starting materials are treated with non-sulfonating condensing agents. As such agents there are suitable, for example, Friedel-Crafts catalysts such, for example, as aluminum chloride or iron chloride, and especially aromatic acid chlorides, for example, benzoyl chloride, naphthoyl chloride, benzotrichloride or benzene sulfochloride. It is especially advantageous to use the chloride of the carboxylic acid of which the acyl radical is present in the starting material. The reaction is advantageously carried out in a high boiling inert organic solvent, for example, nitrobenzene or monochloro-, dichloro- or trichloro-benzene, naphthalene or α-chloronaphthalene, at a raised temperature. The reaction takes place very smoothly and rapidly in the case of those compounds of the Formula 2 in which Z is an alkoxy group.

When compounds of the Formula 2 are used in which Z is a hydrogen atom longer reaction periods are required. Furthermore, it is of advantage in such cases to add an oxidising agent, for example, sodium nitrite or dinitrophenol, or to use a solvent having an oxidising action, for example, nitrobenzene.

In the form of the process referred to under (b) a compound of the Formula 3 is reacted with a reactive derivative, advantageously a halide of a carboxylic acid as defined, and advantageously in a high boiling inert organic solvent, if desired, with the addition of an acid-binding agent.

The products of the above Formula 1 are valuable violet pigments that are distinguished by their good resistance to heat, and especially by their good fastness to light and migration. This is especially important in so-called pigment printing, that is to say, printing processes in which a pigment is fixed on a substratum, especially a textile material, but also on other sheet materials such as paper, for example, wallpaper, or on fabrics of glass fibers, by means of a suitable adhesive, such as casein, a hardenable synthetic resin, especially a urea-formaldehyde or melamine-formaldehyde condensation product, or a solution or emulsion of polyvinyl chloride or polyvinyl acetate or other emulsion, for example, of the oil-in-water or water-in-oil type.

The pigments are also very suitable for other purposes, for example, in a finely dispersed form for dyeing artificial silk of viscose or a cellulose ether or ester or of a superpolyamide or superpolyurethane in the spinning compositions, and also for making colored lacquers or lacquer bases, solutions or products of acetyl-cellulose, nitrocellulose, natural or synthetic resins, such as polymerisation resins, for example, polyvinyl chloride or polystyrene, or condensation resins, for example, aminoplasts, phenoplasts, polyethylene, polyacryl, rubber, casein, silicone or silicone resins. They can also be used with advantage in the manufacture of colored pencils, cosmetic preparations or laminated boards.

Owing to their chemical inertness and good heat resistance the pigments of this invention can be dispersed by the usual methods in compositions or products of the kind mentioned above, and advantageously at a stage in the manufacture of such compositions or products before they have reached their final state. The operations required for shaping, such as spinning, moulding under pressure, hardening, casting, sticking or the like, can therefore be carried out in the presence of the pigments of this invention.

If the pigments are not already in a finely dispersed form and/or in the modification best suited for use, it is desirable to subject them, before use, to a conditioning treatment, for example, by grinding the pigment in a dry or moist aqueous form, advantageously in the presence of a water-soluble or water-insoluble organic solvent, or by kneading or grinding the crude pigment in the presence of a solid assistant, for example, a salt capable of being removed by washing. Combinations of these various treatments may also lead to good results. In many cases it is of advantage, for the purpose of converting it into a finely dispersed form, to grind the crude pigment with the substratum to be colored or with a component of the substratum. The following examples illustrate the invention, the parts and percentages being by weight unless otherwise stated, and the relationship of parts by weight to parts by volume being the same as that of the kilogram to the liter.

*Example 1*

70.1 parts of 2-ethoxy-4-benzoylamino-5-isopropoxy-1-aminobenzene hydrochloride are boiled under reflux with 24.6 parts of chloranil and 65 parts of sodium acetate in 750 parts by volume of alcohol for 15 to 20 hours, the mixture is then filtered while warm, and the filter residue is washed with alcohol and then water.

There is obtained a brown-violet powder, which is 2:5-dichloro - 3:6 - bis - [2' - ethoxy - 4' - benzoyl - amino-5'-isopropoxy-phenylamino]-1:4-benzoquinone.

40 parts of the latter product are heated in 400 parts by volume of orthodichlorobenzene at 165–170° C. with 30 parts by volume of benzoyl chloride for 10 hours. After cooling the mixture, the well crystallized pigment is filtered off with suction, and washed in turn with hot ortho-dichloro-benzene, hot alcohol and hot water and dried. The resulting green pigment having a bronze lustre is 2:6 - dibenzoylamino - 3:7 - di - isopropoxy-9:10-dichloro-triphen-dioxazine. In a state of fine dispersion it colors polyvinyl chloride foils violet tints of very good fastness to light and migration.

The pigment can be brought into a fine state of dispersion by grinding it in the manner described in German Patent No. 1,015,556 to J. R. Geigy A.G., published September 12, 1957, in the presence of a hydrocarbon or substitution product thereof, a salt and a dispersing agent, pasting the ground mixture with water, distilling off the hydrocarbon or substitution product thereof with steam, and separating the pigment from the salt dissolved in water by filtration, and washing the pigment with water and drying it.

The 2 - ethoxy - 4 - benzoylamino - 5 - isopropoxy - 1-aminobenzene used as starting material can be prepared, for example as follows:

97.5 parts of 2-isopropoxy-5-ethoxy-1-aminobenzene (prepared as described in U.S. Patent No. 2,518,077, filed August 8, 1950, by Max Schmid et al., by etherifying an alkali salt of 1-nitro-2-hydroxy-5-ethoxybenzene with isopropyl chloride followed by reduction of the nitro-group) are dissolved in 600 parts by volume of chlorobenzene and 46 parts of pyridine, and, after adding dropwise 80 parts of benzoyl chloride, the whole is heated for 3 hours at 90–95° C. The resulting 2-isopropoxy-5-ethoxy-1-benzoylaminobenzene is filtered off and recrystallized from alcohol and water.

150 parts of the product so obtained are slowly introduced into a solution of 74.5 parts of nitric acid in 360 parts of water, and the nitration mixture is then heated at 50–60° C. for 4 to 5 hours. It is then heated to 90–100° C. and maintained at that temperature for 4 to 5 hours. After cooling the mixture, it is diluted with water, and the nitro-product is filtered off with suction, washed free from acid with water and dried.

115 parts of the resulting 2-ethoxy-4-benzoylamino-5-isopropoxy-1-nitrobenzene are dissolved in 500 parts by volume of alcohol and, after the addition of a nickel catalyst, the product is hydrogenated. After removing the nickel by filtration, the alcohol is distilled off and the residue is isolated in the form of its hydrochloride by the addition of hydrochloric acid.

*Example 2*

The procedure is the same as described in Example 1, except that, instead of 2-ethoxy-4-benzoylamino-5-isopropoxy-1-aminobenzene, there is used an equivalent quantity of 2:5-di-isopropoxy-4-benzoylamino-1-aminobenzene. The same dioxazine pigment as that described in Example 1 is obtained.

*Example 3*

75 parts of 2-methoxy-4-(2':5'-dichlorobenzoylamino)-5-isopropoxy-1-aminobenzene, 24.6 parts of chloranil and 30 parts of crystalline sodium acetate are maintained at the boil under reflux in 750 parts by volume of ethanol for 15 hours. After cooling the mixture, the resulting 2:5 - dichloro - 3:6 - di - [2' - methoxy - 4' - (2":5"-dichlorobenzoylamino) - 5' - isopropoxy - phenylamino]-1:4-benzoquinone is filtered off and washed with ethanol and with water.

80 parts of the product so obtained are heated in 800 parts by volume of ortho-dichlorobenzene at 170–180° C. for 15 hours with 41 parts of 2:5-dichlorobenzoyl chloride. After cooling the mixture to 100° C. the pigment is filtered off, washed with hot ortho-dichlorobenzene, hot alcohol and hot water and dried. The 2:6-di-(2':5'-dichlorobenzoylamino)-3:7-di-isopropoxy-9:10-dichlorotriphen-dioxazine so obtained is a green irridescent crystalline powder. When brought into a finely dispersed state it yields, when rolled into polyvinyl chloride, violet foils of very good fastness to migration and light.

The pigment can be finely dispersed by kneading it for a long time with sodium chloride and an organic solvent, for example, isopropanol, methanol or diacetone alcohol, taking up the kneaded mass in water so that the salt and organic solvent are removed. The pigment is then filtered off, washed with water and dried.

Example 4

A mixture of 24.6 parts of chloranil, 50.8 parts of 1-amino-2:5-di-isopropoxy-4-nitrobenzene, 29 parts of crystalline sodium acetate and 500 parts by volume of ethanol is maintained at the boil under reflux for 24 hours. The reaction product is filtered off, after cooling the mixture, and is washed with alcohol and water. It is a brown crystalline powder. It is then reduced in a dilute solution of caustic soda at 50–70° C. with hydrosulfite, then filtered, and the 2:5-dichloro-3:6-di(2':5'-di-isopropoxy-4'-aminophenylamino)-1:4-benzoquinone is precipitated by blowing air through the reduction solution. After being filtered off, the product is washed with water and dried.

16.4 parts of the latter product are heated with 24 parts of 2:5-dichlorobenzoyl chloride in 200 parts by volume of ortho-dichlorobenzene for 15 hours at 170–180° C. After cooling the mixture it is filtered, and the pigment is washed with hot ortho-dichlorobenzene, hot alcohol and hot water and dried. The same dioxazine pigment is obtained as that described in Example 3.

Example 5

19.4 parts of 1-amino-2:5-di-isopropoxy-4-acetylaminobenzene hydrochloride, 7.5 parts of chloranil and 20 parts of crystalline sodium acetate in 200 parts of ethanol are maintained at the boil for 15 hours. The reaction product is filtered off while hot, and washed with alcohol and water and dried. It is a black-brown powder and it consists of 2:5-dichloro-3:6-di-(2':5'-di-isopropoxy-4'-acetylamino-phenylamino)1:4-benzoquinone.

9 parts of the latter product and 15 parts of 2:4-dichlorobenzoyl chloride are heated in 100 parts by volume of ortho-dichlorobenzene for 15 hours at 170–180° C. After being cooled the product is filtered off, washed with hot ortho-dichlorobenzene, alcohol and water and dried. The resulting 2:6-di-(2':4'-dichlorobenzoylamino)-3:7-di-isopropoxy-9:10-dichlorotriphen-dioxazine is obtained in the form of a green crystalline powder having a bronze lustre. When rolled in a fine state of dispersion into polyvinyl chloride it yields a blue foil having good properties of migration and light.

In the following table are given a number of further dioxazine dyestuffs which are made in the manner described in Example 1, and after being rolled into polyvinyl chloride give the tints mentioned in column 4. The residues $R_1$, $R_2$ and Ar given in the first three columns are those shown in the above Formula 1. In all the dyestuffs X equals Cl.

| | $R_1$ | $R_2$ | Ar | Tint of polyvinyl chloride foil colored with the dioxazine pigment |
|---|---|---|---|---|
| 1. | —$CH_3$ | —$C_2H_5$ | phenyl | violet. |
| 2. | —$CH_3$ | —$C_2H_5$ | 4-Cl-phenyl | Do. |
| 3. | —$CH_3$ | —$C_2H_5$ | 2,5-Cl-phenyl | blue. |
| 4. | —$C_2H_5$ | —$C_2H_5$ | phenyl | violet. |
| 5. | —$C_2H_5$ | —$C_2H_5$ | 4-Br-phenyl | Do. |
| 6. | —$C_2H_5$ | —$C_2H_5$ | 2,5-Cl-phenyl | Do. |
| 7. | —$C_2H_5$ | —$C_2H_5$ | biphenyl | blue. |
| 8. | —$CH_3$ | —$CH_3$ | phenyl | violet. |
| 9. | —$CH_3$ | —$CH_3$ | 4-$OCH_3$-phenyl | blue. |

Example 6

65 parts of polyvinyl chloride, 35 parts of dioctyl phthalate and 0.2 part of the pigment obtained as described in the second paragraph of Example 1 and brought into a state of fine dispersion are stirred together, and then the mixture is rolled to and fro on a two-roller calender for 7 minutes at 140° C. There is obtained a violet foil of very good fastness to light and migration.

What is claimed is:

1. A dioxazine dyestuff which corresponds to the formula

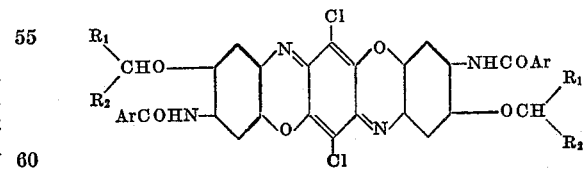

in which $R_1$ and $R_2$ represent alkyl groups having at most 4 carbon atoms and Ar represents a member selected from the group consisting of phenyl, halophenyl, lower alkoxyphenyl, diphenyl and naphthyl.

2. The dioxazine dyestuff of the formula

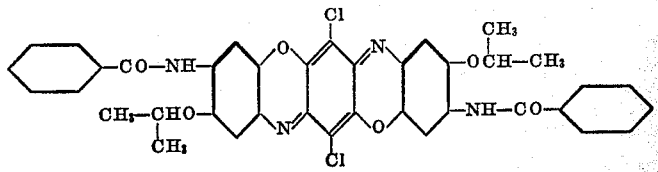

3. The dioxazine dyestuff of the formula
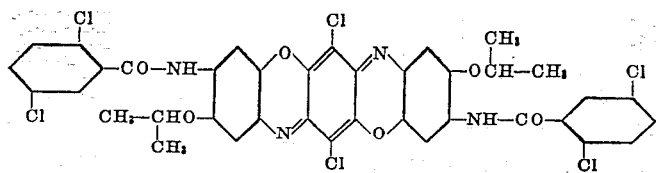
4. The dioxazine dyestuff of the formula
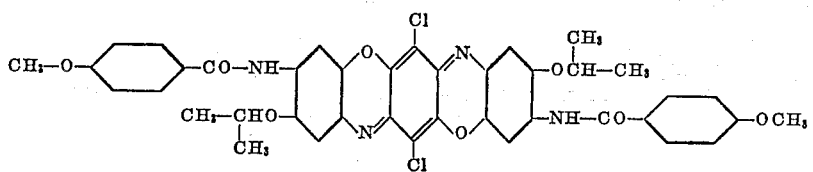
5. The dioxazine dyestuff of the formula
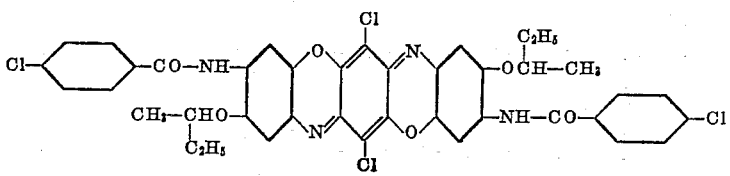
References Cited in the file of this patent
Fierz-David et al.: Helv. Chim. Acta, vol. 22, pp. 1348–58 (1939).
Venkataraman: Chem. of Synthetic Dyes, vol. 1, p. 339 (1952).